United States Patent [19]

Crimmins et al.

[11] 4,381,703
[45] May 3, 1983

[54] VERTICAL SOAK TANK WITH IMPROVED LEVELLING AND WEIGHING APPARATUS

[75] Inventors: Darrell B. Crimmins, Carrollton; George H. Steinmetz, Dallas, both of Tex.

[73] Assignee: Frito-Lay, Inc., Dallas, Tex.

[21] Appl. No.: 348,162

[22] Filed: Feb. 12, 1982

[51] Int. Cl.³ .............................................. B02H 1/04
[52] U.S. Cl. ................................. 99/516; 73/862.49; 99/518; 99/534; 177/147; 366/141; 366/174; 366/316
[58] Field of Search ................ 99/487, 517, 488, 521, 99/516, 519, 518, 520, 534, 522, 536, 611, 600, 524, 609, 523; 177/147; 73/296, 223, 862.49; 222/77, 168; 366/315, 316, 317, 302, 307, 293, 174, 171; 134/153, 134

[56] References Cited

U.S. PATENT DOCUMENTS

| | | | |
|---|---|---|---|
| 1,158,304 | 10/1915 | Schaub | 366/316 |
| 2,592,709 | 4/1952 | Kinnaird | 366/174 |
| 2,767,884 | 10/1956 | Gross | 222/168 |
| 3,194,664 | 7/1965 | Eytinge | 99/534 |
| 3,640,136 | 2/1972 | Nolte | 73/861.73 |
| 3,665,758 | 5/1972 | Tiller | 73/862.49 |
| 3,741,223 | 6/1973 | Kavera et al. | 99/534 |
| 4,094,369 | 6/1978 | Blanc et al. | 177/147 |
| 4,254,699 | 3/1981 | Skinner et al. | 99/516 |

Primary Examiner—Philip R. Coe
Assistant Examiner—Timothy F. Simone
Attorney, Agent, or Firm—Bernard, Rothwell & Brown

[57] ABSTRACT

A vertical soak tank wherein a downwardly moving compact bed of solids is contacted with liquid which floods the bed, includes mechanical components to level the solids and assure that they are maintained in a first-in first-out basis by an incoming materials distributor having inverted cones and rotating levelling rods and bars. The tank has a unique seal between a rotating bottom disc and the side walls, as well as improved means for access to the internal components. The tank also has a weighing system utilizing an external load cell to weigh the solids independently of the liquid in the tank.

15 Claims, 9 Drawing Figures

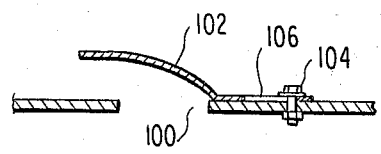
FIG.6
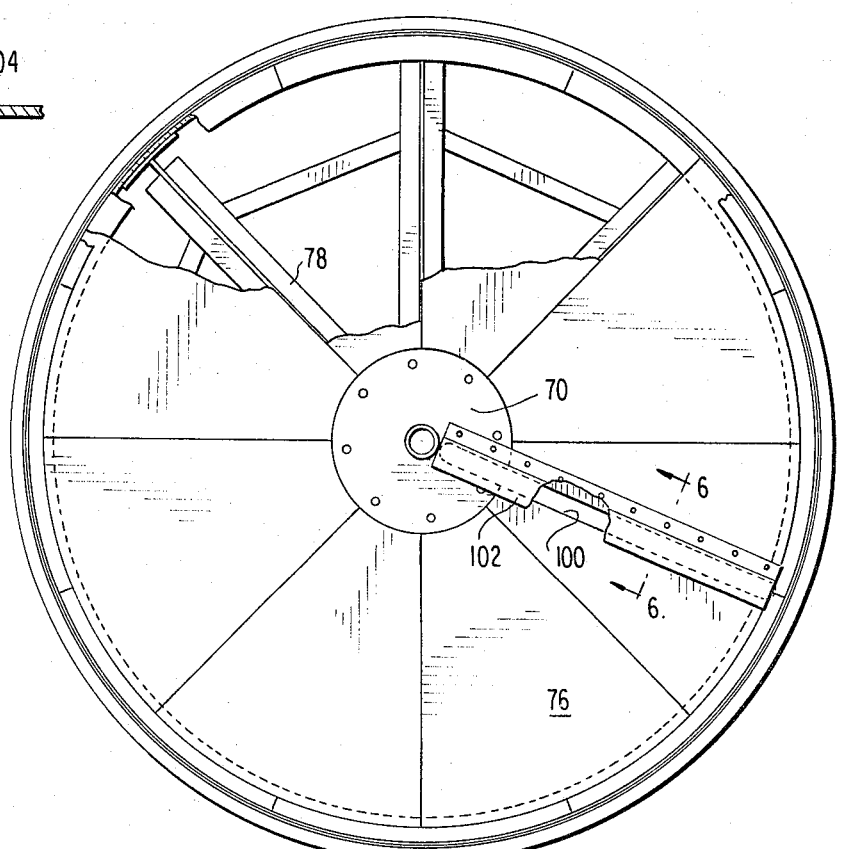
FIG.5
FIG.7
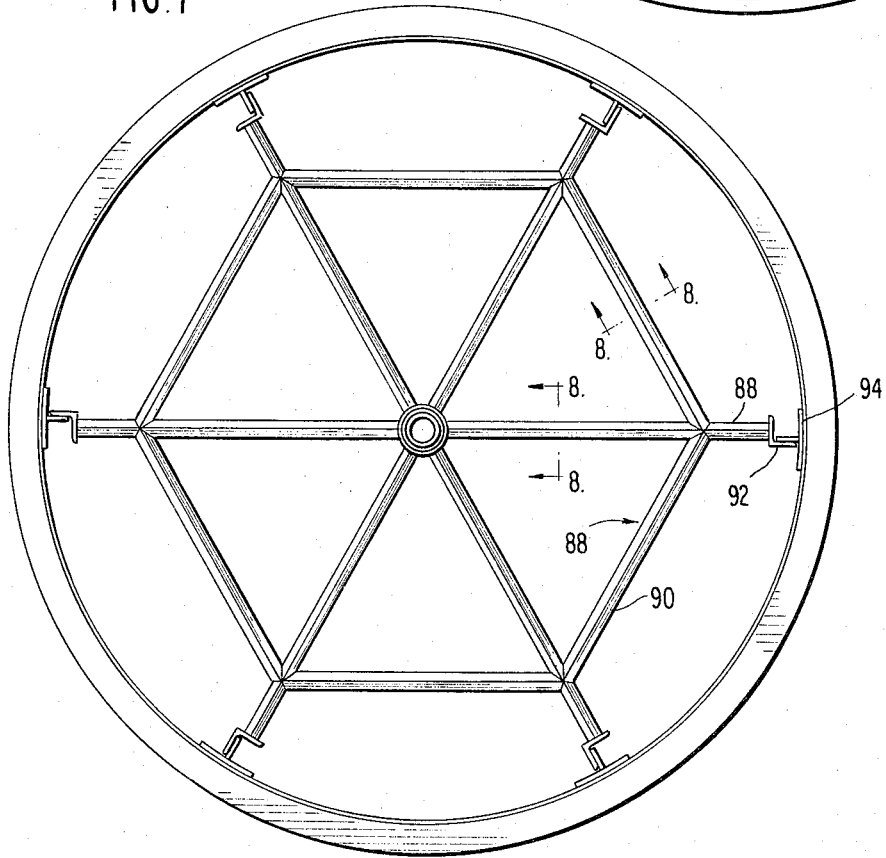
FIG.8
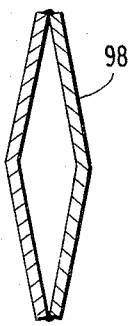

VERTICAL SOAK TANK WITH IMPROVED LEVELLING AND WEIGHING APPARATUS

BACKGROUND OF THE INVENTION

1. Field of the Invention

This invention relates to improvements in an apparatus for providing uniform contact of a downwardly moving, compact bed of particulate solids with a liquid which floods the bed. More particularly, the invention relates to an improved levelling apparatus to insure consistency and proper distribution of particles delivered and moved through the vessel; and to an arrangement for weighing the contents of a tank.

2. Prior Art

In many processes it is desired to contact particulate solids with liquids for a given period of time in order to accomplish a desired chemical or physical modification of the solids. When large amounts of solids are to be treated, it is most advantageous that they be disposed as a relatively compact bed in order to contain the solids in the smallest possible vessel and thereby save the considerable expense that the use of larger vessels would entail. In the compact bed it is desirable that there be little, if any, relative movement of the particles with respect to each other and, in the type of treatment involved, there is no need to provide agitation or intimate mixing of the liquid and solids since mere flooding of the bed with the treating liquid will suffice to accomplish the desired result.

These treatments of solids have often been accomplished in the past merely by providing a number of soaking tanks in which the solids are placed and then flooded with the liquid treating agent. After a period of time, the tanks are emptied and the operation repeated. This type of operation in a batch mode requires a plurality of treating tanks, allotment of periods for loading and unloading, and excessive labor cost. It is more desirable to conduct the operation on a more continuous basis to reduce the vessel capacity required and lower operating expense.

One approach to a more continuous type of treatment has been to feed the solids into the top of a treating vessel containing the treating liquid and remove treated solids from the bottom, and, in doing so, it is desired that the solids be disposed as a compact, downwardly moving bed in order to utilize a vessel of relatively small capacity for the amount of solids to be processed. Although appearing quite simple, difficulties in this operation do arise. In order to obtain a uniform length of contact between the solids and the treating liquid, any given solid particle should have approximately equal residence time in the liquid. To accomplish this goal, the compact bed should move relatively uniformly, downwardly through the vessel across substantially the entire cross-section of the vessel. This type of flow has often been characterized as plug flow and indicates the substantial absence of flow channels through the bed wherein some particles move faster than in other portions of the bed.

It is known to provide a vertical soak tank to accomplish relatively uniform, gravity flow, of the compact bed of particulate solids through a vessel containing the solids in contact with a liquid which floods the bed to fill the interstices between the solids over a substantial height of the vessel, for example in the commonly owned application of Wisdom et al., Ser. No. 972,404 filed Dec. 22, 1978. Such tanks are especially useful in contacting the solids with a liquid treating agent in order that the solids passing through the vessel have a relatively uniform residence time in contact with the liquid thereby insuring that given portions of the solids will not be treated for materially greater or lesser times than desired. As an example, the treatment of corn solids with an aqueous solution of calcium hydroxide can be accomplished in a continuous manner in such tanks at relatively uniform residence times. Such treatment facilitates the further processing of the corn without having to unduly adjust subsequent treating operations as might be required if the products withdrawn from the treating vessel were not subjected to relatively uniform treatment with the liquid.

In addition to problems noted above in obtaining plug flow, problems have also been encountered in initially distributing particles into the soak tank. One prior art approach involved feed pipes which simply dumped the corn or other particles into the vessel. This approach created mounds of particles beneath each pipe thus concentrating the particles in distinct areas with corresponding voids therebetween. As a result, the desired levelling effect is not achieved and the voids and concentrations may pass through the tank possibly creating different soak times for particular particles. In the Wisdom et al. application referred to above rotating equipment was utilized to distribute particles entering the vessel, somewhat successfully, but has required undue maintenance. Wisdom et al. shows a rotating perforated disc with a spreader arm positioned immediately above the disc for spreading particles thereover. Often the particles flowing and precipitation of solids of the liquid in and around this type of rotating equipment have caused clogging, jamming and otherwise impeded the movement of the spreader arm as well as other parts of the distribution apparatus. Substantial maintenance is required to keep the apparatus sufficiently clean and to avoid clogging, etc.

In determining the soak time it would be desirable to have the material being delivered to the vessel weighed such that an accurate accounting of the amount of material delivered is obtained. In the past this has been accomplished by weighing the material, or physically measuring the height of the corn bed, prior to the delivery; however, due to the unsymmetrical shape of the materials used, it is difficult to determine in advance exactly how much material the tank can hold particularly when it is compacted and levelled by the levelling system described above. Consequently, it is highly desirable to actually weigh the material once it is in the tank. This however presents problems due to the construction and contents of the tank which were previously thought to be impossible to overcome.

SUMMARY OF THE INVENTION

This invention provides for relatively uniform, downward movement by gravity of the compact bed of particulate solids through a treating vessel while in contact with a treating liquid which occupies or floods the vessel over a substantial portion of its height. The flooding liquid thus occupies the interstices between the solid particles which are in particle-to-particle contact substantially throughout the compact bed. Also, the movement of the bed through the vessel is sufficiently slow so that there is relatively little particle-to-particle movement or intermixing, and substantial channeling of particle flow through the bed is avoided. This operation is made possible by providing the vessel with especially designed means for controlling the flow of solids through or from the bed in the region of its lower portion.

The invention is particularly useful in treating grains with a liquid which serves to facilitate dehulling. For example, solids such as whole corn grains can be contacted with an aqueous solution of lime at, for instance, temperatures of about 95° F. to 145° F. Suitable treating times include, for instance, about 6 to 16 hours or more.

This invention includes a levelling system which avoids the clogging problems of the above described vessel rotating spreading equipment and its maintenance problems. The distribution system of the invention includes stationary distributors with deflectors as well as levelling bars and rods which rotate at or slightly beneath the uppermost level of the bed of material being treated. The deflectors include four equally spaced inverted cones located beneath the delivery pipes to spread the material delivered from the pipes throughout the upper portions of the bed to further distribute material being delivered from the pipes and to eliminate voids and concentrations before these materials in the bed reach the lower portions of the vessel. By locating this apparatus in the upper portion of the vessel there is little or no adverse effect on the plug flow in the portion of the vessel beneath the levelling bars and rods. In other words, there is created the desired consistency without the undesired channeling which otherwise might occur.

Another feature of this invention is a load cell which measures the weight of the feed material actually delivered to the tank. This enables an accurate measurement to determine the soak time as well as any other processing step that revolves around the weight and density of the material delivered to the vessel. The apparatus for accomplishing this weighing step includes a lower disc which supports the entire bed of material in the vessel secured to a rotatable shaft. The weight on the disc is transmitted via a calibration rod to a load cell for measuring the weight of the solids.

BRIEF DESCRIPTION OF THE DRAWING

FIG. 3 is sectional side elevation view showing the components on the inside of the tank in FIG. 1.

FIG. 3-A is an enlarged detailed sectional elevation view of a portion of the apparatus shown in FIG. 3.

FIG. 6 is a sectional view taken along line 6—6 of FIG. 5.

FIG. 7 is a bottom plan view taken along line 7—7 of FIG. 3.

FIG. 8 is a sectional view taken along line 8—8 of FIG. 7.

DETAILED DESCRIPTION OF THE PREFERRED EMBODIMENT

Figure 1:
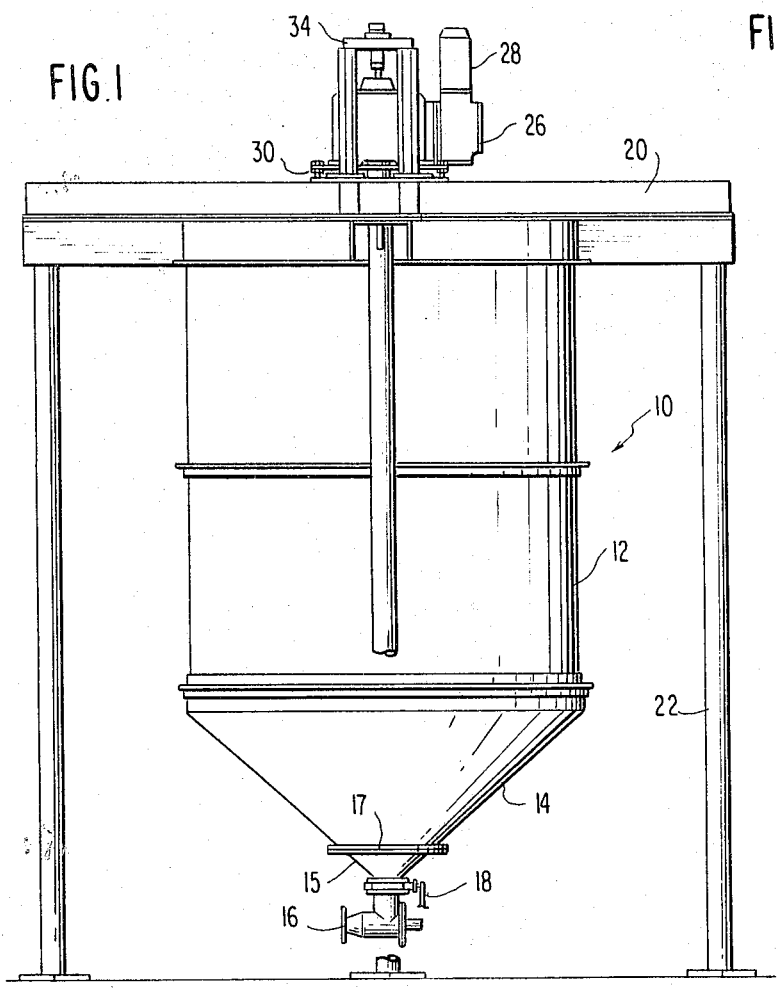
FIG. 1 is a front elevation of the vertical soak tank and supporting structure of this invention.

With reference to the drawings and particularly FIG. 1 a vertical soak tank 10 has cylindrical sides 12 and a hopper bottom portion 14 leading to an outlet 16. A butterfly valve 18 is used for isolating the contents of the tank from the downstream piping for maintenance and repair purposes. The bottom 15 of the hopper has a flange 17 to allow its removal for access purposes, thus eliminating the need for a manhole in the side of the tank. A fluid assisted discharge and liquid level adjustment means is provided by high pressure water entering through pipe 19 and discharging into a venturi section at outlet 16, see FIG. 3.

Figure 2:
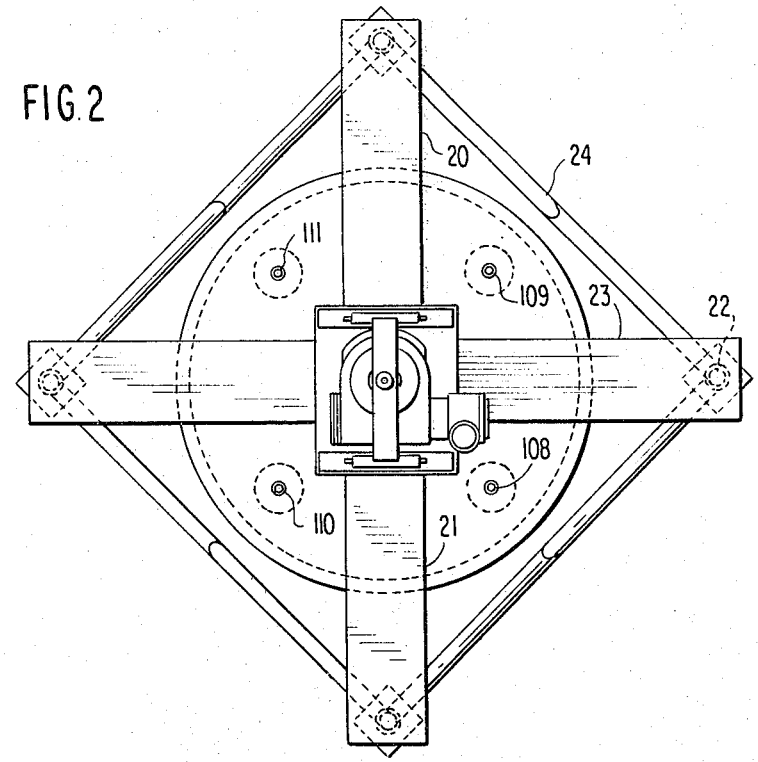
FIG. 2 is a top elevation of the apparatus shown in FIG. 1.

The tank is supported from above by bridge member 20 in the form of cross-beams 23 as shown in FIGS. 1 and 2. The bridge itself is supported by four vertical columns 22 and braced by cross-members 24, see FIG. 2. A channel 25 around the top of the tank is secured to the bridge 20 so that the tank is supported from its top edge. This has the advantage of always having the tank walls in tension and eliminating the possibility of wall buckling from compression loading.

On top of the tank there is a drive assembly 26 including a motor 28 for driving a central shaft to be described. This entire assembly is a commercially available Cone Drive made by Ex-Cell-O Corporation. This drive assembly rests on a support plate 30. This support is adjustable via screws 31 from plate 33 on top of bridge 20 to accomplish vertical adjustment of the movable components in the tank which are supported from plate 30. Above the drive assembly there are a plurality of uprights 32 and a cross-plate 34 supported from the bridge 20. The top of the tank may be covered with removable sheet metal splash plates, not shown.

Figure 4:
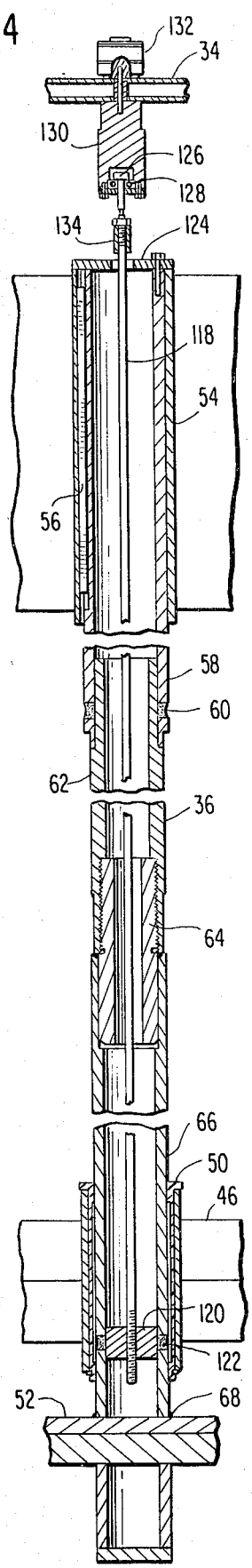
FIG. 4 is a sectional view on a vertical section of a central drive and support rod.

A hollow drive shaft 36 for driving the rotary components within the tank is shown in FIG. 3 and a sectional elevation thereof is shown in FIG. 4. This drive shaft 36 has attached to it twisted leveller bars 38 at the nominal upper level of solid material in the tank, and slightly below the level of the liquid in the tank. These leveller bars are connected via adjustable connecting hubs 40 to the shaft 36, so that their position on the shaft may be varied. At a lower level in the tank round rods 42 are secured to this rotating shaft 36 also by adjustable hubs 44. The rods extend at right angles to the bars when viewed from the top.

Further down in the tank there is a stator member 46 which is adjustably secured to the wall 12 of the tank 10 via bracket 48. A split plastic bearing 50 is provided around the shaft 36 for journalling the shaft 36 at the hub or center of the stator 46.

A bottom disc 52 is attached to the bottom of the rotary shaft 36 and supports the solids being soaked and rotates to gradually and continuously empty the solids from the tank 10.

Referring now to FIG. 4 and the details of shaft 36, a hollow shaft 54 of the drive assembly 26 is keyed via key 56 to a top section 58 of shaft 36 to therefore power the shaft 36. A middle section 62 of shaft 36 is welded via welds to the top section, and an intermediate connector 64 is threaded to the middle section and welded to a lower section 66 of the shaft 36. The lower section 36 is welded via welds 68 to the center of disc 52.

Figure 5:
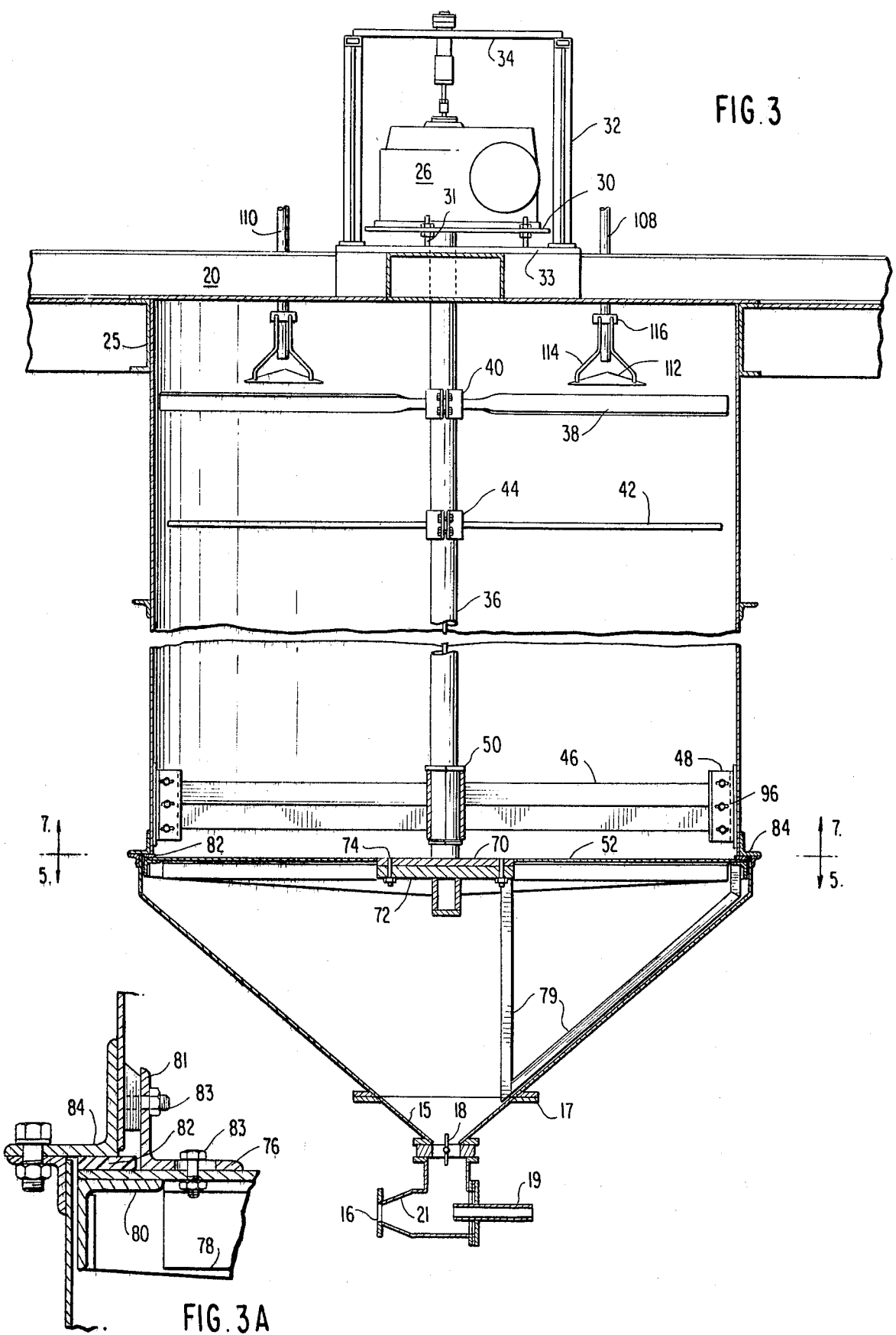
FIG. 5 is a top plan view looking along line 5—5 of FIG. 3.

As shown in FIG. 5 disc 52 has a top hub 70 and a bottom hub 72 connected together by bolts 74 and surrounded by a plurality of sector-shaped plates 76 providing a rotating bottom to the tank. A bridge breaker 79 attached to the rotating disc sweeps the side walls of the hopper to break any bridges which would build up there. Below the sector plates 76 is a spider-like support including radial support arms 78 which in turn are connected to an outer circular angle member 80, see FIG. 3-A.

A seal betwee the disc 52 and the wall of the tank is provided by a polypropylene ring 82 secured to the disc and contacting an angle 84 in a wall of the tank 10 as shown in FIG. 3-A.

For maintenance purposes a plurality of clips 81 may be connected by screws 83 to the tank wall and disc 52 as shown in FIG. 3A. Thus, the reducer drive 26 and other components can be removed and the disc will not drop in the hopper.

The stator is shown in detail in FIG. 7 wherein its web-like layout consists of radial arms 88 and intermediate cord-like connectors 90. Angle bracket connections 92 at the end of the radial arms mate with T-connectors 94 on the inside of the tank via horizontal slots 96 which are connected adjustably by bolts 97. The adjustment is made to center the shaft 36 and disc 52 within the tank. As shown in FIG. 8 all of the members of the stator are diamond shaped for best flow of the material in the tank, and to prevent the solids from resting on the top of the stator and turning with the stator.

As shown in FIG. 6 the arrangement for continuously removing the solid material from the tank starts with the solids resting on top of rotating disc 52. This arrangement includes a radial exit slot 100 covered by a forwardly facing scoop member 102 affixed to a sector plate 76 via bolt and nut 104. A slot 106 provides for adjustability.

Four inlet lines, 108, 109, 110 and 111, one for each quadrant of the tank are indicated in FIGS. 2 and 3. Spaced from the outlet of each inlet pipe below the top of the tank is an inverted cone-shaped deflector 112 which is fixedly supported by depending fingers 114 attached to collars 116 surrounding each of the inlet pipes.

For weighing the contents supported by rotating disc 52 there is provided a calibration rod 118 having its lower end threaded into plug 120 which in turn is welded into the center of lower section 66 of rotating shaft 36. The calibration rod 118 extends upwardly and out through a central hole and cap 124 and is provided at its upper end with an adjustable T-shaped hanger 126 the heads of which are supported on balls 128 within member 130. Member 130 is threadedly connected to a load cell 132 resting on cross-member 34 so that the weight on rotating disc 52 may be applied to load cell 132 for determining the weight of the contents of the bin. The load cell may be of a type commercially available from Lebow Associates, Inc., Troy, Mich. A nut 134 on the bottom of hanger 126 may be turned to adjust the tension on calibration rod to zero the load cell.

In operation the solids and liquid are delivered to the tank via inlets 108, 109, 110, 111 and after they enter they are deflected and spread generally equally by inverted cone-shaped deflectors 112. For levelling the solids contents within the tank the levelling bars 38 are rotated by shaft 36, usually under the level of the water by about 9" and about 12" below the level of the deflector cones at the normal level of the top of the solids. It is found that this is efficient in levelling the solids at their upper level.

The levelling rods 42 are round in section and about 18" below the bars 18 to provide secondary levelling during the flow of the material through the tank top to bottom.

Material on the bottom disc 52 is gradually emptied at the bottom of the hopper during rotation of the disc through exit 100 via the scoop. Stator 46 immediately above the rotating disc 52 prevents rotation of the bed of solids by the disc.

It has been found that providing the particular arrangement shown with the multiple entrance pipes each with its own deflector, combined with the levelling bars and rods, overcomes problems in evenly levelling the materials, and spreading the material. It also eliminates the clogging and cleaning problems associated with the prior art.

In utilization of the load cell to weigh the solids content of the tank resting on disc 52, the load cell is first adjusted to zero to adjust out the weight supported by the calibration rod when there are no solids in the tank but the tank is filled to the normal level with liquid. This adjustment is made via nut 134. Then when the tank is loaded with solids on the disc 52 the load cell measures the weight of these solids only, but in the liquid, therefore there must be a calculation to determine the true weight of solids. The weight of solids can be utilized to control the feed and eventually the soak time by the use of suitable controls and microprocessors, not shown.

The tank construction is particularly adapted for ease in maintenance. In addition to having the top levelling bars under the level of the liquid and distributing the liquids and solids originally without any moving parts, other features to aid maintenance include; the removable hopper bottom 15, the butterfly valve 18, the narrow tip of diamond-shaped stator section 98, the support clips 81 to hold the disc 52. For necessary adjustment of the rotating equipment inside the tank the stator support slots 96 provide for radial centering of shaft 36 and the jack screws 31 provide for vertical adjustment to assure the disc 52 mates properly with seal 82.

What is claimed is:

1. A vertical soak tank apparatus for contacting solids and liquids while slowly and continuously moving the solids vertically by gravity plug flow through the tank, the tank including, a central vertical drive shaft extending downward, a rotatable horizontal disc driven by the drive shaft and supported adjacent to the bottom of the vertical tank means, an emptying slot in the disc for emptying materials supported on the disc as the disc rotates in a controlled manner, and improved means for adding solids and liquids to the tank and assuring continuous plug flow, comprising; at least one downwardly extending inlet pipe with a deflector spaced below the exit to the inlet pipe adjacent the top portion of the tank so that material entering the inlet pipe is spread by the deflector evenly over the surface of material already in the tank, solids levelling means attached to the drive shaft, at a level below the deflector, below a normal liquid level in the tank, and not above the normal top level of the solids in the tank.

2. An apparatus as in claim 1 wherein there are four entrance pipes and deflectors one for each quadrant of the tank.

3. An apparatus as in claim 1 wherein the solids levelling means includes bar members extending radially from the disc drive shaft beneath the level of the liquid and adjacent the level of the solids in the tank.

4. An apparatus as in claim 3 wherein the bar members are twisted bars extending from hubs adjustably attached to the drive shaft.

5. An apparatus as in claim 4 wherein the solids levelling means further comprises levelling rods extending from the drive shaft below the level of the twisted bars.

6. An apparatus as in claim 1 further comprising a stator of web-like layout with the portions thereof being diamond-shaped in cross-section.

7. An apparatus as in claim 1 wherein the periphery of the rotatable disc is sealed to the inside of the vertical tank by an annular seal.

8. An apparatus as in claim 1 wherein the vertical tank has a hopper bottom split and flanged in a horizontal plane to provide access.

9. An apparatus as in claim 1 further comprising removable clip means for rigidly securing the top of the rotatable disc to the tank wall for maintenance purposes.

10. Apparatus as in claim 1 further comprising means for supporting the vertical tank from the top of the sides thereof.

11. Apparatus as in claim 1 further comprising hydraulic means at the bottom of the hopper for removing materials to adjust the liquid level in the tank.

12. Apparatus as in claim 1 further comprising means within the drive shaft to measure the weight of solids supported by the rotating disc in the tank.

13. Apparatus as in claim 1 further comprising gear reducer means for driving the shaft from above the tank, the gear reducer means mounted on a platform adjustably supported from the vertical tank support so that the vertical level of the shaft can be adjusted.

14. Apparatus for continuously determining the weight of a load of solids supported on a shaft-driven rotatable disc inside a vertical soak tank, comprising; a calibration rod extending from within the disc drive shaft to the top of the tank, driving means at the top of the rod, stationary support means, and a load cell contacting the support means, and bearing the load of the calibration rod, shaft, disc, and materials supported on the disc.

15. Apparatus as in claim 14 wherein the calibration rod is adjustable to zero the load cell to adjust for the weight of the components supported by the load cell while in the liquid.

* * * * *